(12) United States Patent
Takahama et al.

(10) Patent No.: US 9,656,720 B2
(45) Date of Patent: May 23, 2017

(54) BICYCLE PEDAL

(75) Inventors: Kimitaka Takahama, Osaka (JP);
Nobuyuki Kakinoki, Osaka (JP);
Akira Inoue, Osaka (JP); Shinpei Okajima, Osaka (JP)

(73) Assignee: Shimano Inc., Osaka (JP)

( * ) Notice: Subject to any disclaimer, the term of this patent is extended or adjusted under 35 U.S.C. 154(b) by 2002 days.

(21) Appl. No.: 11/950,002

(22) Filed: Dec. 4, 2007

(65) Prior Publication Data
US 2009/0139369 A1   Jun. 4, 2009

(51) Int. Cl.
*B62K 23/06* (2006.01)
*F16B 2/10* (2006.01)
*B62M 3/08* (2006.01)

(52) U.S. Cl.
CPC ............ *B62M 3/086* (2013.01); *Y10T 74/217* (2015.01)

(58) Field of Classification Search
CPC .. B62M 3/08; B62K 23/06; F16B 2/10; B62L 3/023; Y10T 74/20396
USPC ................. 74/594.4, 594.6; 36/131
See application file for complete search history.

(56) References Cited

U.S. PATENT DOCUMENTS

| | | | | |
|---|---|---|---|---|
| 4,928,549 A | * | 5/1990 | Nagano | 74/594.6 |
| 4,947,708 A | * | 8/1990 | Lacombe | 74/594.6 |
| D324,838 S | * | 3/1992 | Briscadieu | D12/125 |
| 5,105,683 A | * | 4/1992 | Mercat et al. | 74/594.6 |
| 5,131,291 A | * | 7/1992 | Beyl | 74/594.6 |
| 5,497,680 A | * | 3/1996 | Nagano | 74/594.6 |
| 5,727,429 A | * | 3/1998 | Ueda | 74/594.6 |
| 6,205,885 B1 | | 3/2001 | Hermansen et al. | |
| 6,305,244 B1 | * | 10/2001 | Takahama | 74/594.6 |
| 6,708,584 B2 | * | 3/2004 | Muraoka | 74/594.6 |
| 6,722,229 B2 | * | 4/2004 | Muraoka | 74/594.6 |
| 6,845,688 B2 | | 1/2005 | Muraoka | |
| 6,997,080 B2 | * | 2/2006 | Muraoka et al. | 74/594.6 |
| 7,073,409 B2 | * | 7/2006 | Ho | 74/594.6 |

(Continued)

FOREIGN PATENT DOCUMENTS

| | | |
|---|---|---|
| AT | 0 25 633 E | 6/1985 |
| DE | 36 31 036 A1 | 3/1989 |

(Continued)

OTHER PUBLICATIONS

English Abstract of FR 2912373 A1, Herve et al., Aug. 15, 2008.*

(Continued)

*Primary Examiner* — Vinh Luong
(74) *Attorney, Agent, or Firm* — Global IP Counselors, LLP

(57) ABSTRACT

A bicycle pedal is provided with a pedal body having a front cleat retainer and a rear cleat retainer. The rear cleat retainer is pivotally coupled to the pedal body about a rear pivot axis. The front cleat retainer has a forward cleat stopping point facing towards the rear end of the pedal body. The rear cleat retainer has a rear cleat step-in point facing away from the pedal body. The forward and rear cleat stopping points and the rear pivot axis define a triangle with a first side interconnecting the forward and rear cleat stopping points, a second side interconnecting the rear cleat step-in point and the rear pivot axis, and a third side interconnecting the forward cleat stopping point and the rear pivot axis, with an interior angle of ninety degrees or less between the first and second sides of the triangle.

13 Claims, 11 Drawing Sheets

(56) References Cited

U.S. PATENT DOCUMENTS

| | | | |
|---|---|---|---|
| 7,526,982 B2 * | 5/2009 | Chen ............................ | 74/594.6 |
| 2004/0089098 A1 * | 5/2004 | Plassiard et al. ............ | 74/594.6 |
| 2005/0223844 A1 | 10/2005 | Plassiard et al. | |
| 2012/0132030 A1 * | 5/2012 | Kamada ................ | B62M 3/086 |
| | | | 74/594.6 |

FOREIGN PATENT DOCUMENTS

| | | | | |
|---|---|---|---|---|
| DE | 602 20 607 T2 | 2/2008 | | |
| EP | 1 063 161 A1 * | 12/2000 | .............. | B62M 3/08 |
| EP | 1340674 A2 * | 9/2003 | .............. | B62M 3/08 |
| EP | 2 607 222 A1 * | 6/2013 | .............. | B62M 3/08 |
| FR | 2 862 041 * | 5/2005 | .............. | B62M 3/08 |
| FR | 2912373 A1 * | 8/2008 | .............. | B62M 3/08 |
| WO | WO 2005/102827 A1 * | 11/2005 | .............. | B62M 3/08 |

OTHER PUBLICATIONS

Annotated Drawing, Shimano, SPD-SL PD-7800, available prior to Dec. 4, 2007.
Annotated Photograph, Shimano, PD-7810, available prior to Dec. 4, 2007.
Annotated Photograph, Look KeO HM, available prior to Dec. 4, 2007.
Annotated Photograph, Look KeO Carbon, available prior to Dec. 4, 2007.
Annotated Photograph, Campagnolo Profit, available prior to Dec. 4, 2007.
Annotated Photograph, Time RXS Carbon, available prior to Dec. 4, 2007.
Annotated Photograph, Shimano PD-M97, available prior to Dec. 4, 2007.

* cited by examiner

BICYCLE PEDAL

BACKGROUND OF THE INVENTION

Field of the Invention

This invention generally relates to a bicycle pedal. More specifically, the present invention relates to a bicycle pedal of the step-in type of pedal.

Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle as well as the frame of the bicycle. One component that has been extensively redesigned is the bicycle pedal.

In recent years, bicycle pedals have been designed for specific purposes such as for pleasure, off road biking, road racing, etc. One particular type of bicycle pedal, which is gaining more popularity, is the step-in or clipless pedal, which releasably engages a cleat secured to the sole of a cyclist's shoe. The clipless pedal has a pedal spindle that can be mounted on the crank of a bicycle, a pedal body that is rotatably supported on this pedal spindle, and a cleat engagement mechanism. In an off road bicycle pedal a cleat engagement mechanism is formed on both sides of the pedal body for engaging a cleat. A road-racing pedal, on the other hand, typically only has a cleat engagement mechanism on one side of the pedal body. In either case, in these types of bicycle pedals, the rider steps onto the pedal and the cleat engagement mechanism automatically grips on to the cleat secured to the bottom of the cyclist's shoe.

With this type of step-in or clipless pedal, the shoe and the pedal are in a state of constant engagement when the cleat is engaged in the cleat retainers, so the pedaling force can be transmitted efficiently to the pedals. As a result, step-in or clipless pedals are widely employed on racing bicycles used in road racing and mountain bike racing.

When attaching the cyclist's shoe to the step-in or clipless pedal via the cleat, the cyclist moves the shoe obliquely downwardly and forwardly relative to the pedal body such that the front end of the cleat engages a front hook or cleat retainer of the pedal body. Once the front end of the cleat is engaged with the front hook of the pedal body, the cyclist places the rear end of the cleat in contact with a guide portion of the rear hook or cleat retainer of the pedal body. In this position, the cyclist presses the shoe downwardly against the pedal to cause the rear hook or cleat retainer to initially pivot rearwardly against the force of a spring to move the rear hook or cleat retainer to a cleat releasing position. The rear end of the cleat then enters a position opposite a back face of the rear hook or cleat retainer. Then, the rear hook or cleat retainer returns under the force of a biasing member or spring so that the rear hook or cleat retainer engages the rear end of the cleat. This engagement fixes the cyclist's shoe to the pedal via the cleat.

When releasing the shoe from the pedal, the cyclist will typically turn the shoe about an axis perpendicular or approximately perpendicular to the tread of the pedal, using the front end of the cleat as a pivoting point. As a result of this pivoting action, the rear hook or cleat retainer is pivoted rearwardly against the force of the spring to a cleat releasing position to release the shoe.

In view of the above, it will be apparent to those skilled in the art from this disclosure that there exists a need for an improved bicycle pedal. This invention addresses this need in the art as well as other needs, which will become apparent to those skilled in the art from this disclosure.

SUMMARY OF THE INVENTION

One object of the present invention is to provide a bicycle pedal that is configured and arranged such that a cleat can be easily coupled to the pedal.

According to one aspect of the present invention, a bicycle pedal is provided that basically comprises a pedal shaft, a pedal body, a front cleat retainer, a rear cleat retainer and a rear biasing element. The pedal body has a first end and a second end, with the pedal shaft being rotatably coupled to the pedal body. The front cleat retainer is disposed on the first end of the pedal body. The front cleat retainer has a downwardly facing first cleat retaining surface and a forward cleat stopping point facing towards the second end of the pedal body. The rear cleat retainer is pivotally coupled to the second end of the pedal body about a rear pivot axis by at least one pivot pin. The rear cleat retainer has a downwardly facing second cleat retaining surface and a rear cleat step-in point facing away from the pedal body. The rear biasing element is operatively disposed between the pedal body and the rear cleat retainer to bias the rear cleat retainer to a cleat retaining position. The forward cleat stopping point, the rear pivot axis and a rear cleat step-in point are arranged to define a triangle with a first side of the triangle interconnecting the forward cleat stopping point and the rear cleat step-in point, a second side of the triangle interconnecting the rear cleat step-in point and the rear pivot axis, and a third side of the triangle interconnecting the forward cleat stopping point and the rear pivot axis, with the triangle having an interior angle of ninety degrees or less between the first and second sides of the triangle.

According to another aspect of the present invention, a bicycle shoe cleat is provided that basically comprises a connecting portion, a rear attachment portion and a front attachment portion. The connecting portion has an upper sole side facing in a first direction, a lower pedal side facing in a second direction which is substantially opposite to the first direction and a pair of lateral spaced apart attachment holes. The rear attachment portion extends from a rear end of the connecting portion, with the rear attachment portion having a rear coupling surface facing in the first direction and a cleat control facing in a rearward direction. The front attachment portion extends from a front end of the connecting portion, with the front attachment portion having a front coupling surface facing in the first direction and a front cleat control facing in a forward direction. The front attachment portion has a maximum overall longitudinal length in a range of 20 millimeters or less as measured from the center connecting portion to a front tip of the front attachment portion.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
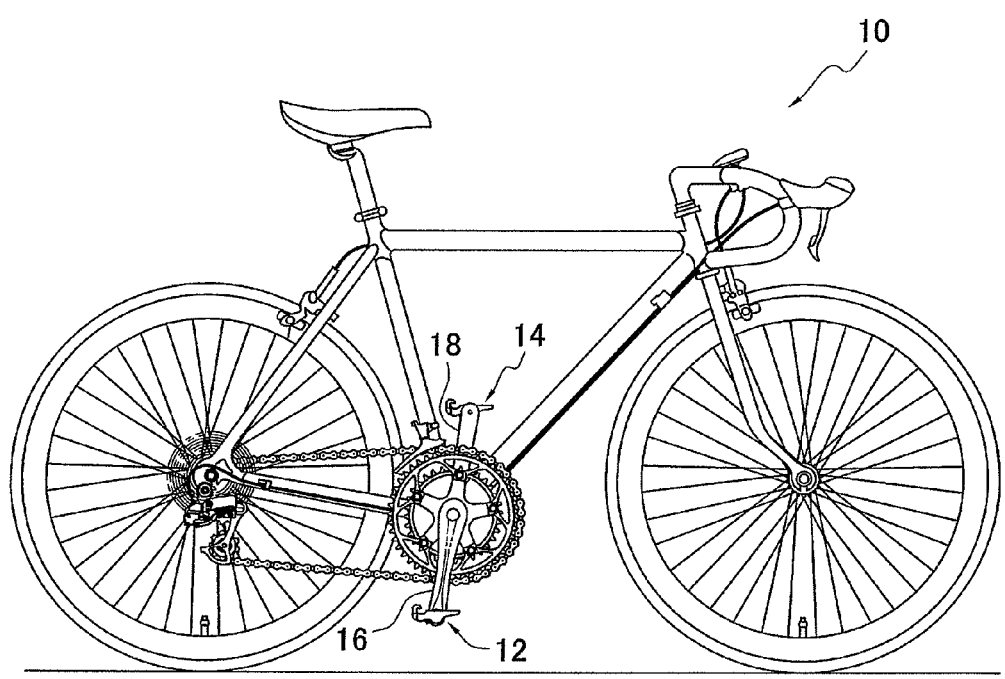
FIG. 1 is a side elevational view of a bicycle that is equipped with a pair of bicycle pedals in accordance with a first embodiment.

Referring initially to FIG. 1, a bicycle 10 is illustrated that is equipped with a right bicycle pedal 12 and a left bicycle pedal 14 in accordance with a first embodiment of the present invention. The bicycle the pedals 12 and 14 are fixedly coupled to a pair of bicycle crank arms 16 and 18 of the bicycle 10 for rotation therewith. The bicycle pedals 12 and 14 are clipless or step-in pedals. The right bicycle pedal 12 selectively and releasably receives a bicycle shoe cleat 20, as seen in FIGS. 2 to 5, to releasably attach a bicycle shoe 22 thereto for releasably coupling a cyclist's foot to the bicycle pedal 12. The bicycle pedal 12 and the bicycle shoe cleat 20 form a bicycle pedal assembly. The bicycle pedal 12 is especially designed for use with road bicycles as opposed to use with an off-road bicycle. However, it will be apparent to those skilled in the art from this disclosure that the features of the bicycle pedal 12 can be used in the construction of an off-road type of bicycle pedal assembly if needed and/or desired. In other words, it will be apparent from this disclosure that the principles of this embodiment could be applied to a pedal with a two-sided attachment design in which the cleat 20 can be attached to either side of the pedal.

The left bicycle pedal 14 is a mirror image of the right bicycle pedal 12, and also releasably receives a bicycle shoe cleat (not shown) that is identical to the bicycle shoe cleat 20. Thus, it will be apparent to those skilled in the art that the descriptions of the right bicycle pedal 12 also apply to the left bicycle pedal 14, and the left bicycle pedal 14 will not be discussed and/or illustrated in detail herein for the sake of brevity.

Figure 3:
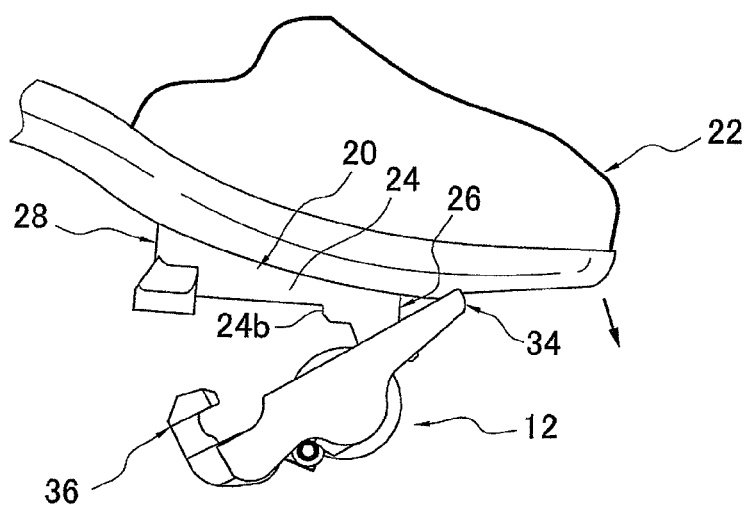
FIG. 3 is a simplified side elevational view of the cleat, the right bicycle shoe and the right bicycle pedal, with the cleat initially contacting the front cleat retainer of the right bicycle pedal.
Figure 4:
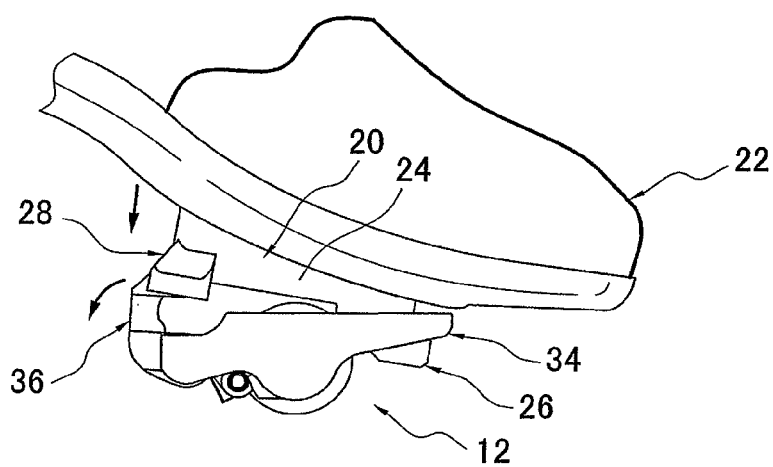
FIG. 4 is a simplified side elevational view, similar to FIG. 3, of the cleat, the right bicycle shoe and the right bicycle pedal, but with the cleat initially contacting the rear cleat retainer of the right bicycle pedal.
Figure 5:
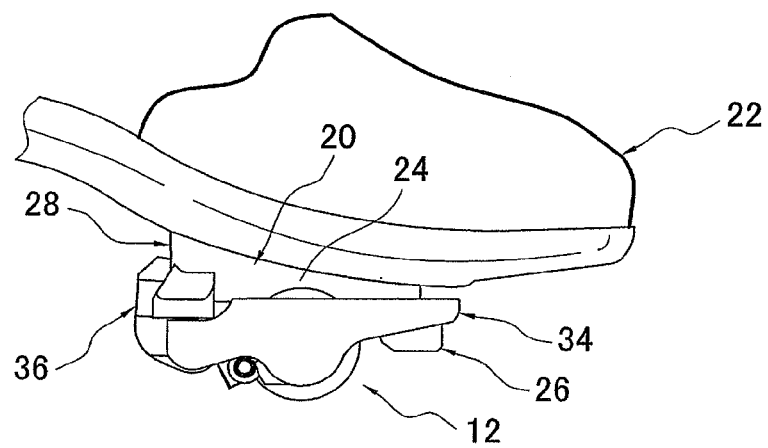
FIG. 5 is a simplified side elevational view, similar to FIGS. 3 and 4, of the cleat, the right bicycle shoe and the right bicycle pedal, but after full engagement between the cleat and the rear cleat retainer of the bicycle pedal.
Figure 6:
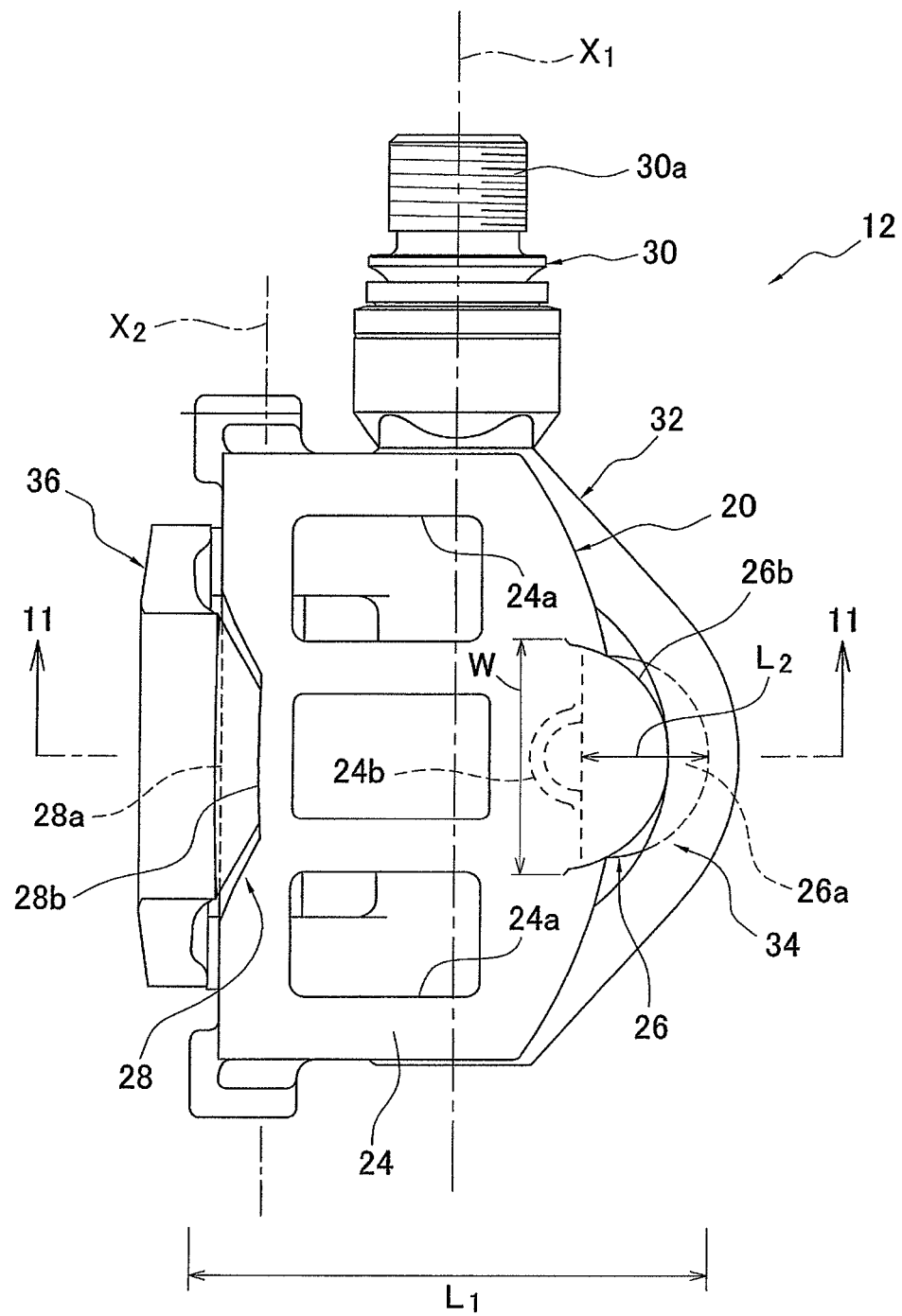
FIG. 6 is a top plan view of the cleat and the right bicycle pedal in accordance with the first embodiment, with the cleat attached to the right bicycle pedal.

Referring to FIGS. 3 to 5, the cleat 20 is engaged with the pedal 12 by pressing the cleat 20 into the pedal 12 with a forward and downward motion. This releasably locks the cleat 20 to the pedal 12. The cleat 20 can be released from pedal 12 by twisting the heel of the shoe to the outside of the pedal 12 as discussed below in more detail. However, the shoe 22 is preferably capable of limited rotation or float about a rear float pivot axis prior to disengagement. The basic methods of engaging and disengaging the cleat 20 to and from the pedal 12 are known in the art and will not be discussed further.

First, the bicycle shoe cleat 20 will be briefly discussed with reference to FIGS. 2 to 6. Basically, the bicycle shoe cleat 20 basically includes a center connecting portion 24, a first or front attachment portion 26 extending from one end of center connecting portion 24 and a second or rear attachment portion 28 extending from the other end of the center connecting portion 24. Preferably, the center connecting portion 24 and the attachment portions 26 and 28 are integrally formed together as a one-piece, unitary member, which is constructed from a suitable rigid material, such as a hard rigid plastic material or a metallic material. The bicycle shoe cleat 20 preferably has a maximum overall longitudinal length $L_1$ of 52.9 millimeters between the attachment portions 26 and 28 in the illustrated embodiment.

Figure 2:
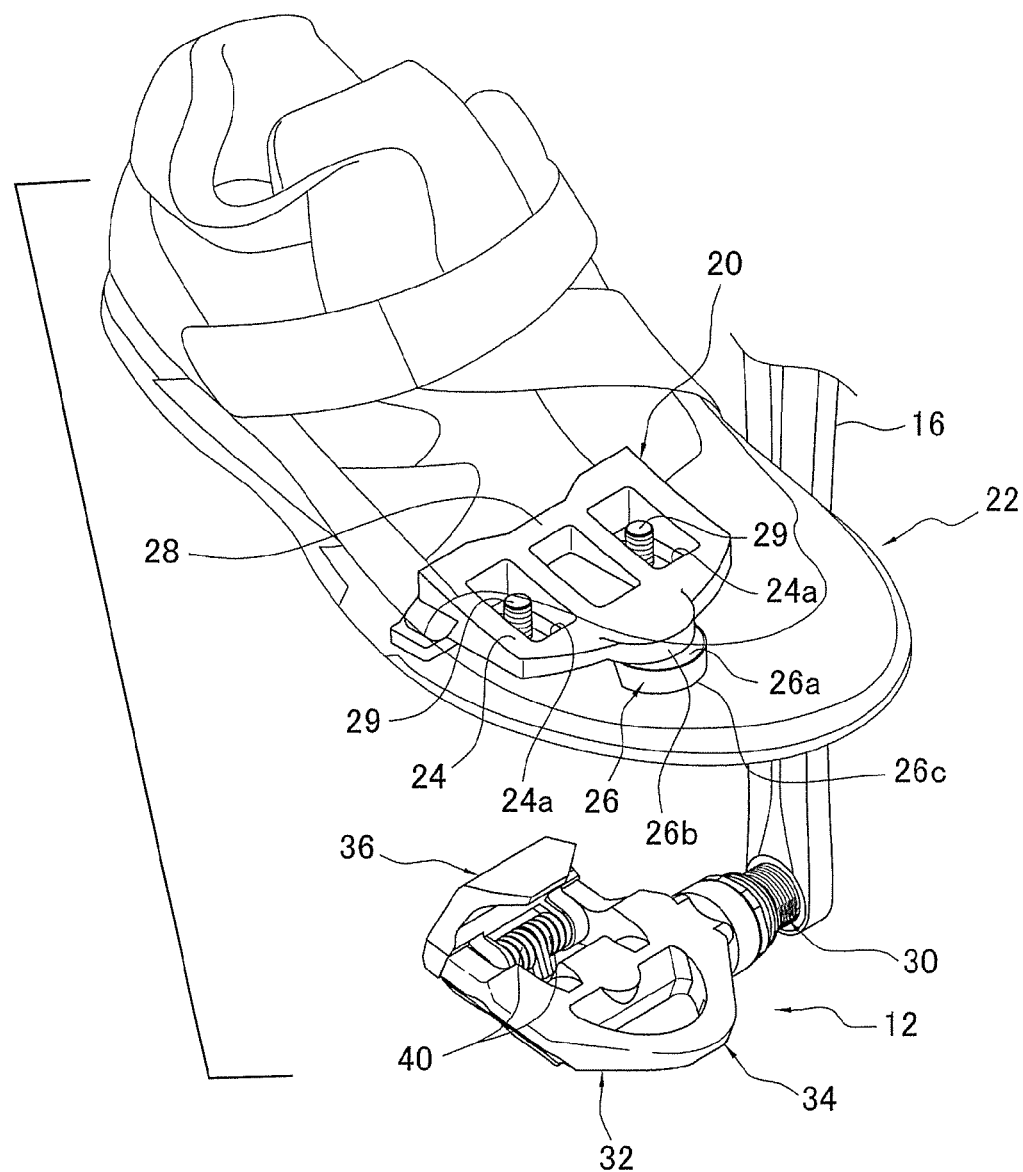
FIG. 2 is a partially exploded, perspective view of a right bicycle shoe with a cleat attached thereto and a right bicycle crank with a right bicycle pedal attached thereto in accordance with the first embodiment.
Figure 11:
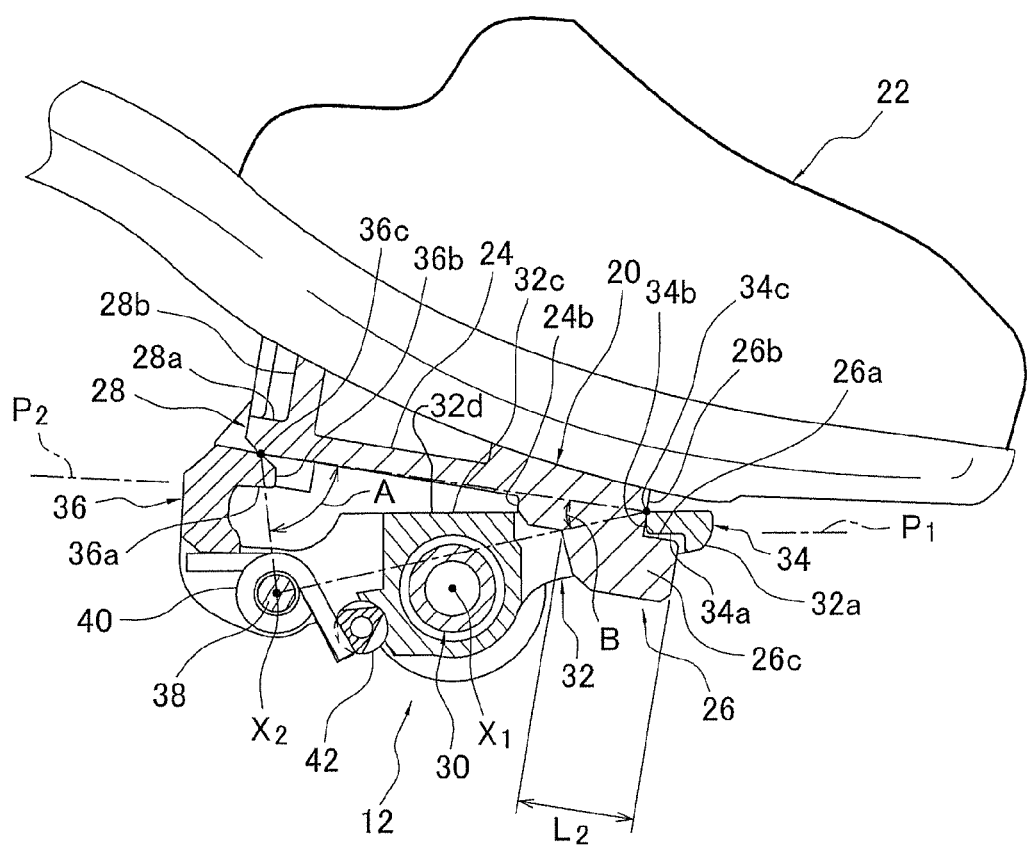
FIG. 11 is longitudinal (center) cross-sectional view of the right bicycle pedal and the cleat, as seen along section line 11-11 of FIG. 6, upon initial contact between the cleat and the rear cleat retainer of the right bicycle pedal.
Figure 12:
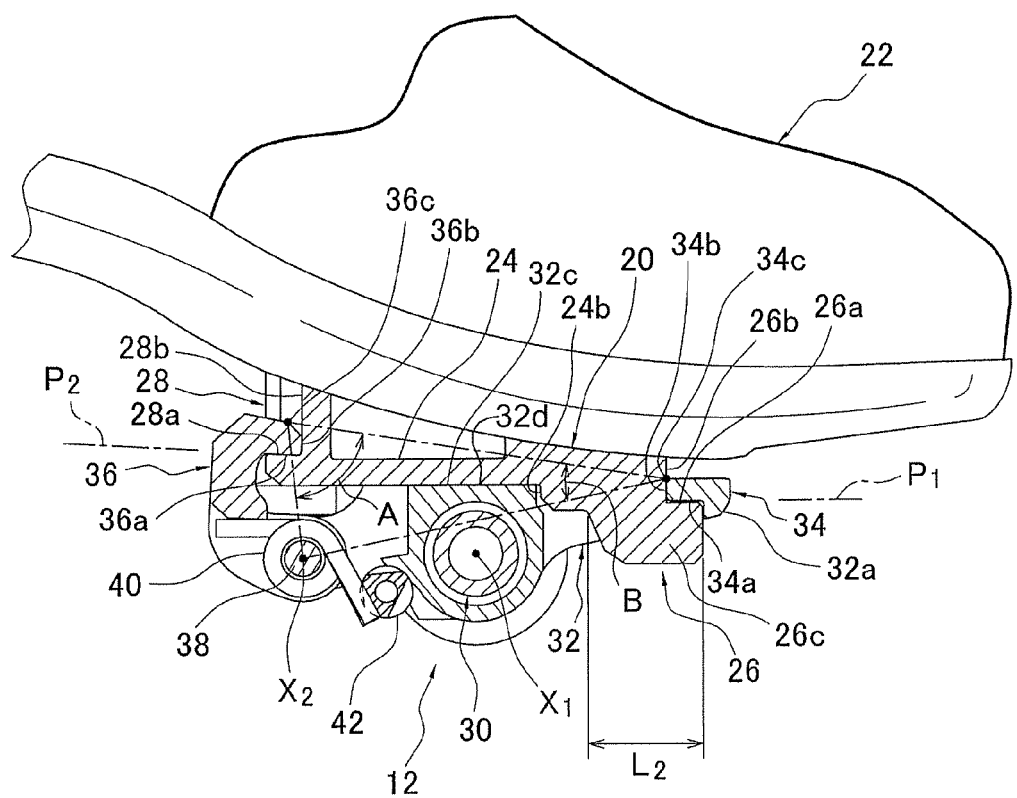
FIG. 12 is a longitudinal (center) cross-sectional view, similar to FIG. 11, of the right bicycle and the cleat, upon full engagement of the cleat and the rear cleat retainer of the right bicycle pedal.

The center connecting portion 24 of the bicycle shoe cleat 20 has a pair of lateral spaced apart attachment holes 24a formed therein. The attachment holes 24a receive fasteners 29 to attach the bicycle shoe cleat 20 to the bicycle shoe 22 as seen in FIG. 2. The center connecting portion 24 has an upper sole side facing in a first direction for engaging the sole of the bicycle shoe 22 and a lower (bottom) pedal side facing in a second direction which is substantially opposite to the first direction. As seen in FIGS. 11 and 12, the center connecting portion 24 preferably has a rearwardly facing stop surface 24b formed by a projection part 24c disposed on the bottom pedal facing side of the connecting portion 24. The stop surface 24b is configured and arranged to contact the bicycle pedal 12 to limiting rearward movement of the bicycle shoe cleat 20 relative to the bicycle pedal 12.

The front attachment portion 26 of the bicycle shoe cleat 20 basically includes a front coupling surface 26a and a front cleat control surface 26b. In the illustrated embodiment, the front attachment portion 26 has a lower protruding part 26c. Preferably, the front attachment portion 26 has a maximum overall longitudinal length $L_2$ in the range of 20 millimeters or less as measured from the center connecting portion 24 to a front tip of the front attachment portion 26. However, in the illustrated embodiment, the maximum overall longitudinal length of the front attachment portion 26 is more preferably of 13.2 millimeters. Here the rearmost edge of the front attachment portion 26 is defined as the intersection between the bottom surface of the center connecting portion 24 and the lower protruding part 26c. The maximum overall width W of the front attachment portion 26 is defined as the area between the inner sides of the attachment holes 24a. The front coupling surface 26a is selectively engageable with the front end of the bicycle pedal 12 to retain the front end of the bicycle shoe cleat 20 to the front end of the bicycle pedal 12. The front cleat control surface 26b cooperates with the front end of the bicycle pedal 12 to control forward longitudinal movement of the bicycle shoe cleat 20 relative to the bicycle pedal 12. Specifically, the front cleat control surface 26b is a transverse surface extending upwardly from the front coupling surface 26a. Preferably the front cleat control surface 26b extends substantially perpendicular to the front coupling surface 26a and includes a central convex curved surface.

The rear attachment portion 28 of the bicycle shoe cleat 20 basically includes a rear coupling surface 28a and a rear cleat control surface 28b. The rear coupling surface 28a is selectively engageable with the rear end of the bicycle pedal 12 to retain the rear end of the bicycle shoe cleat 20 to the rear end of the bicycle pedal 12. The rear cleat control surface 28b cooperates with the rear end of the bicycle pedal 12 to control rearward longitudinal movement of the bicycle shoe cleat 20 relative to the bicycle pedal 12. Specifically, the rear cleat control surface 28b is a transverse surface extending upwardly from the rear coupling surface 28a. Preferably the rear cleat control surface 28b is an inclined surface forming an angle of about ninety degrees with the rear coupling surface 28a and includes a straight center surface and a pair of inclined side surfaces.

As seen in FIGS. 2 and 7 to 10, the bicycle pedal 12 basically includes a pedal spindle or shaft 30, a pedal body 32 with an integrated front cleat retainer 34, a rear cleat retainer 36, a rear pivot pin 38 and a pair of rear torsion springs 40. Optionally, the bicycle pedal 12 further includes a spring force adjustment member 42 disposed between the pedal body 32 and the rear torsion springs 40. The front cleat retainer 34 is rigidly fixed to the pedal body 32 in a non-movably manner, while the rear cleat retainer 36 is pivotally coupled to the pedal body 32 by the rear pivot pin 38. The front and rear cleat retainers 34 and 36 cooperate with an upper surface of the pedal body 32 to define a cleat engagement mechanism, with the rear cleat retainer 36 being arranged to move between a cleat attached position and a cleat release position.

Figure 7:
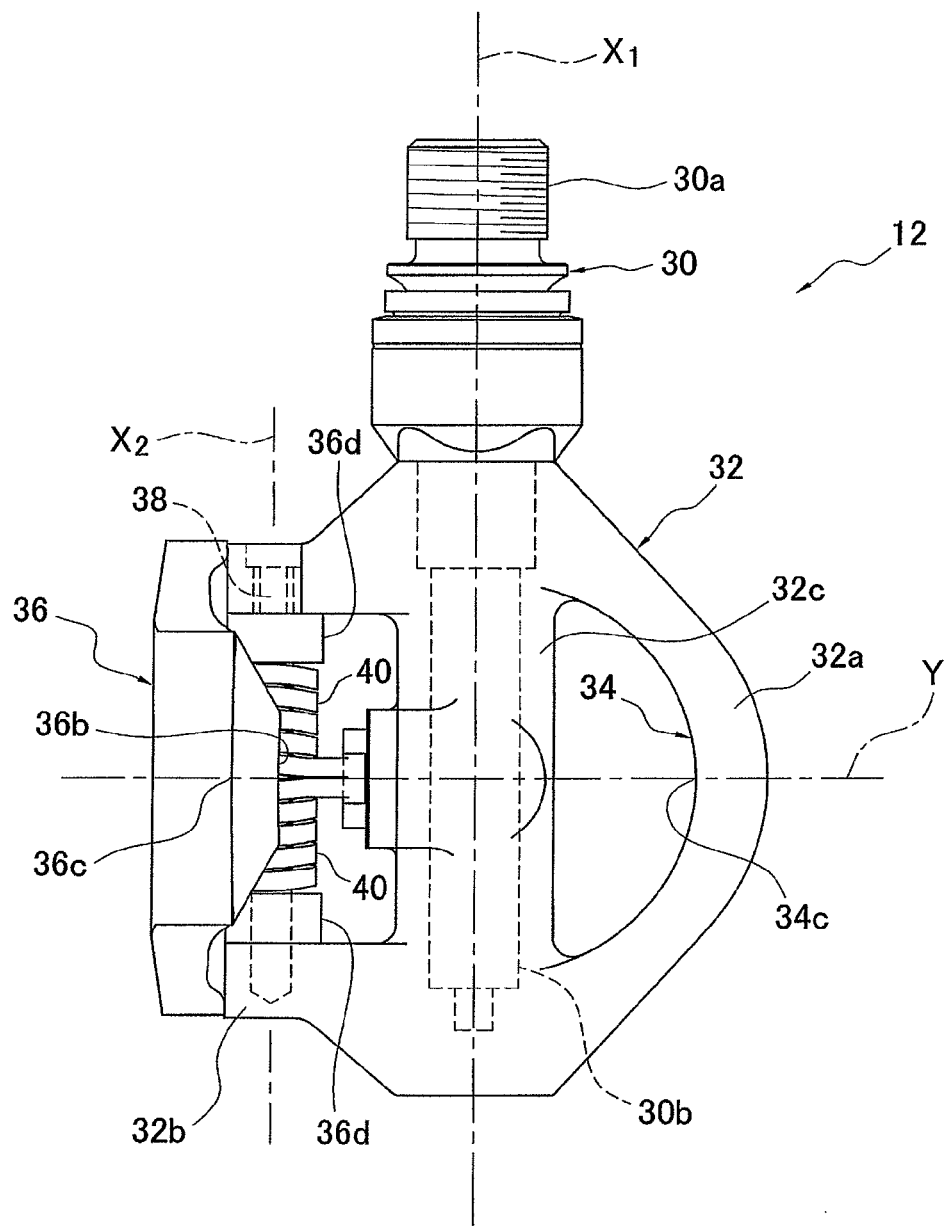
FIG. 7 is a top plan view of the right bicycle pedal in accordance with the first embodiment.
Figure 8:
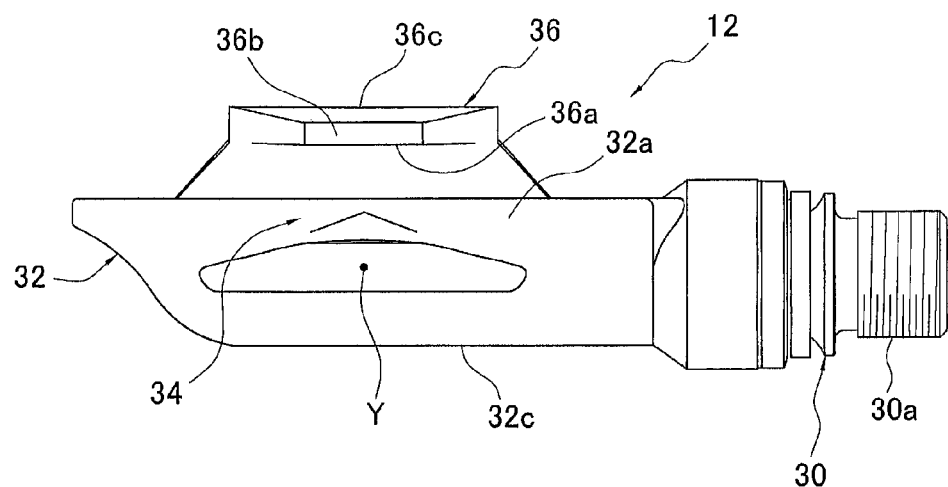
FIG. 8 is a front elevational view of the right bicycle pedal illustrated in FIG. 7.

As seen in FIG. 2, the pedal shaft 30 is adapted to be coupled to the crank arm of the bicycle with the pedal body 32 being rotatably coupled to the pedal shaft 30 for supporting a cyclist's foot. Specifically, as seen in FIG. 7, the pedal shaft 30 has a first attachment end 30a and a second support end 30b. The pedal shaft 30 is preferably a metal, multi-step spindle having several stepped portions. The pedal shaft 30 is rotatably coupled within a hollow area of the pedal body 32 in a conventional manner. In particular, the pedal shaft 30 is secured within the hollow area of the pedal body 32 by an inner tube (not shown) and a lock nut (not shown) in a conventional manner. More specifically, the pedal shaft 30 has the lock nut mounted thereon to secure a bearing assembly (not shown) and the pedal shaft 30 within the hollow area of the pedal body 32. Since these parts are relatively conventional parts and the specific constructions of these parts are not critical to the present invention, they will not be discussed or illustrated in detail herein. Rather, these parts will only be discussed as necessary to understand the present invention.

The first attachment end 30a is threaded to threadedly engage a threaded hole of the crank arm as seen in FIG. 2 in a conventional manner. Preferably, the thread of the right pedal 12 is preferably a clockwise thread such that the right pedal 12. In the case of the left pedal 14, the thread of the left pedal shaft (not shown) is preferably a counterclockwise thread. The second support end 30b rotatably supports the pedal body 32. A center longitudinal axis $X_1$ extends between the first and second ends 30a and 30b of the pedal shaft 30. The pedal body 32 is freely rotatable about the center longitudinal axis $X_1$ by a conventional bearing assembly (not shown). A cleat receiving area is formed on one side of the pedal body 32 for receiving and supporting the cleat 14 thereon. More specifically, the cleat receiving area is defined as the space located between the front and rear cleat retainers 34 and 36.

The pedal body 32 is preferably made of a lightweight rigid metallic material such as an aluminum alloy. One of the cleat retainers 34 and 36 is located at each end of pedal body 32. In particular, the pedal body 32 has a first (front) closed end 32a and a second (rear) open end 32b, with the pedal shaft 30 being rotatably coupled to an intermediate portion 32c of the pedal body 32.

The front cleat retainer 34 is disposed on the first end 32a of the pedal body 32. Preferably, the front cleat retainer 34 is integrally formed with the pedal body 32 such that the pedal body 32 and the front cleat retainer 34 are a one-piece, unitary member. Thus, the front cleat retainer 34 is preferably formed of lightweight rigid metallic material such as aluminum alloy. The front cleat retainer 34 has a downwardly facing first cleat retaining surface 34a and a front pedal control surface 34b with a forward cleat stopping point 34c facing towards the second or rear end 32b of the pedal body 32. The forward cleat stopping point 34c is a point that lies at the center of the front pedal control surface 34b.

Figure 9:
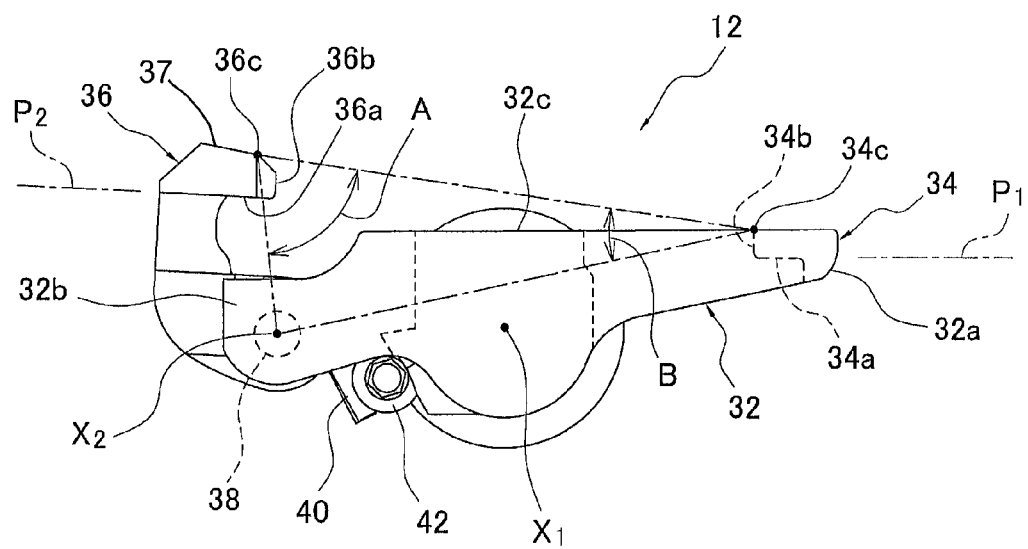
FIG. 9 is an outside elevational view of the right bicycle pedal illustrated in FIGS. 7 and 8.

The front cleat retaining surface 34a is a substantially flat surface that faces in a downward (first) direction when the pedal 12 is in the normal in-use position. As seen in FIG. 9, the front cleat retaining surface 34a lies in a first plane $P_1$. The front pedal control surface 34b is a transverse surface extending upwardly from the rear edge of the front cleat retaining surface 34a. More specifically, the front pedal control surface 34b is preferably arranged substantially perpendicular to the front cleat retaining surface 34a. The front pedal control surface 34b is formed of a concave curved surface centered on the center longitudinal axis Y. The forward cleat stopping point 34c lies on the center longitudinal axis Y and is the point at which the cleat 20 initially contacts during a step-in operation to attach the cleat 20 to the pedal 12.

Figure 10:
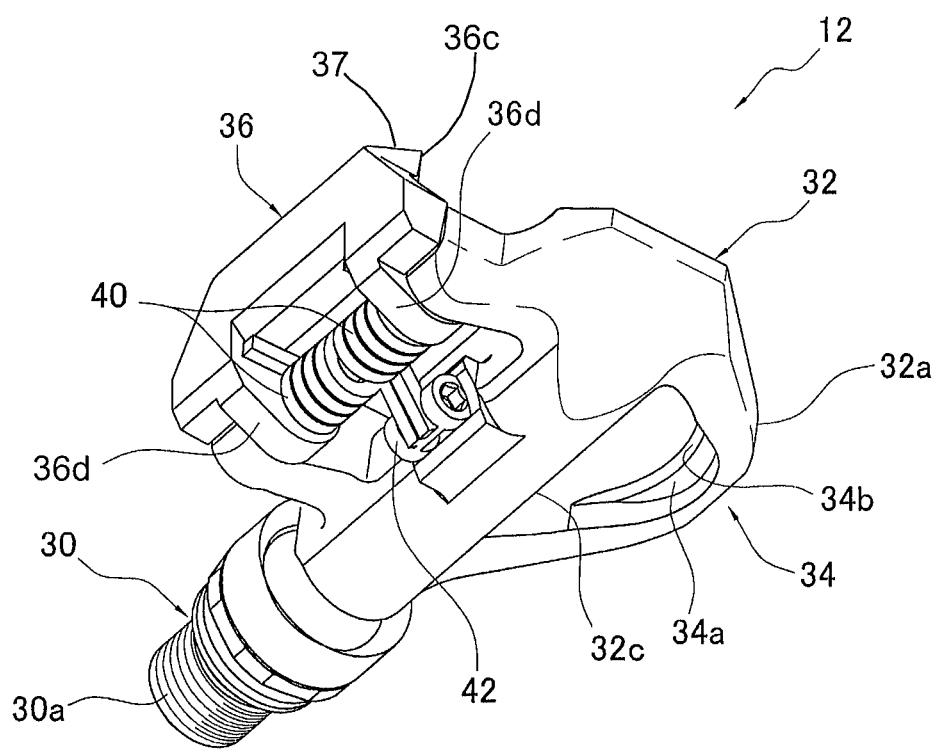
FIG. 10 is a bottom perspective view of the right bicycle pedal illustrated in FIGS. 6 to 9 as viewed from the rear end of the right bicycle pedal.

The rear cleat retainer 36 has a roughly U-shaped configuration, with its two ends being pivotally supported by the pivot pin 38 that passes between the side portions of the rear end 32b of the pedal body 32. In other words, the rear cleat retainer 36 is pivotally coupled to the rear end 32b of the pedal body 32 about a rear pivot axis $X_2$ defined by the pivot pin 38, as indicated in FIG. 9. The rear cleat retainer 36 has a rear clamping portion 37 that includes a downwardly facing second cleat retaining surface 36a, a rear pedal control surface 36b and a rear cleat step-in point 36c facing away from the pedal body 32. As seen in FIG. 7, the rear cleat retainer 36 has a pair of mounting flanges 36d for mounting the rear cleat retainer 36 on the pivot pin 38. As seen in FIGS. 9 and 10, the rear cleat retainer 36 is a single member such that the mounting flanges 36d and the rear clamping portion 37 are free of any intermediate pivot points or pivot axis therebetween along the rear cleat retainer 36. Thus, the rear cleat retainer 36 is preferably a non-wire retainer. As is shown in FIGS. 7 and 11, the pivot pin 38 extends through the mounting flanges 36d of the rear cleat retainer 36. The pivot pin 38 further extends through portions of the rear end 32b of the pedal body 32.

The rear cleat step-in point 36c as used herein refers to the point on the rear cleat retainer 36 where the rear attachment portion 28 of the bicycle shoe cleat 20 initially contacts the rear cleat retainer 36 to apply a force to pivot the rear cleat retainer 36 rearwardly to couple the bicycle shoe cleat 20 thereto. In the illustrated embodiment, the rear cleat retainer 36 is located vertical above the cleat retaining surface 36a.

As seen in FIG. 9, the forward cleat stopping point 34c, the rear pivot axis $X_2$ and the rear cleat step-in point 36c are arranged to define a triangle with a first side of the triangle interconnecting the forward cleat stopping point 34c and the rear cleat step-in point 36c, a second side of the triangle interconnecting the rear cleat step-in point 36c and the rear pivot axis $X_2$, and a third side of the triangle interconnecting the forward cleat stopping point 34c and the rear pivot axis $X_2$, with the triangle having an interior angle A of ninety degrees or less between the first and second sides of the triangle. Preferably, the interior angle A lies within the range of 52 degrees and 75 degrees. Preferably, a front interior angle B is formed between the first and third sides of the triangle with the front interior angle B lying within the range of 21 degrees and 27 degrees. Thus, the forward cleat stopping point 34c, the rear pivot axis $X_2$ and the rear cleat step-in point 36c are arranged such that the triangle is an acute triangle. In the illustrated embodiment, as seen in FIG. 9, the interior angle A is 75 degrees and the front interior angle B is 21 degrees. Also as seen in FIG. 9, the rear pivot axis $X_2$ of the rear cleat retainer 36 is located closer to the rearward cleat stopping point 36b of the rear cleat retainer 36 than the forward cleat stopping point 34c of the front cleat retainer 34. Preferably, the forward cleat stopping point 34c, the rear pivot axis $X_2$ and the rear cleat step-in point 36c are further arranged such that the third side of the triangle lies above the center rotation axis $X_1$ of the pedal shaft 30.

The intermediate portion 32c of the pedal body 32 is a tubular shaft supporting portion that has a center cleat contacting surface 32d (FIGS. 9, 11 and 12) that faces upwardly when the pedal body 32 is in a normal in-use position and a cleat stop surface that faces forwardly when the pedal body 32 is in a normal in-use position. The intermediate portion 32c receives the pedal shaft 30 for rotation about the center longitudinal axis $X_1$. The center cleat contacting surface 32d lies in a generally flat plane that faces upwardly from the pedal body 32 for supporting the cleat 20. More specifically, the center cleat contacting surface 32d cooperates with the front and rear cleat retainers 34 and 36 to limit movement of the cleat 20 in a direction substantially perpendicular to the center cleat contacting surface 32d. The center cleat contacting surface 32d of the pedal body 32 lies in a horizontal plane disposed below the second cleat retaining surface 36a of the rear cleat retainer 36 and above the first cleat retaining surface 34a of the front cleat retainer 34 as seen in FIG. 9.

The torsion springs 40 form a rear biasing element that is operatively disposed between the pedal body 32 and the rear cleat retainer 36 to bias the rear cleat retainer 36 to a cleat retaining position. The torsion springs 40 have their mounting or coiled portions mounted on the pivot pin 38, with one end of each spring engaging the spring force adjustment member 42 (indirectly engaging a part of the pedal body 32) and the other end of each spring engaging the rear cleat retainer 36. The springs 40 normally urge the rear cleat retainer 36 to rotate about the pivot pin 38 from the cleat releasing position to the cleat engaging or clamping position. In other words, the springs 40 normally maintain the rear cleat retainer 36 in the cleat engaging position. As shown in FIGS. 9 and 10, with no cleat present, the springs 40 urge the rear cleat retainer 36 to a fully biased position, hereinafter referred to as a first position. Hence, the springs 40 (rear biasing elements) which are operatively disposed between the pedal body 32 and the rear cleat retainer 36, bias the rear clamping portion of the rear cleat retainer 36 to the first position. While two springs 40 are preferably mounted on the pivot pin 38, it will be apparent to those skilled in the art from this disclosure that fewer or more springs can be used. Moreover, it will be apparent to those skilled in the art the other types of urging member(s)/resilient member(s) could be utilized to carry out the present invention. Accordingly, the term "biasing element" as used herein refers to one or more members that apply an urging force between two parts.

As best seen in FIGS. 10 and 11, the spring force adjustment member 42 is mounted between the pedal body 32 and the springs 40 to adjust the biasing force of the springs 40 applied to the rear cleat retainer 36. The spring force adjustment member 42 is basically a pin shaped member that can be rotated on a curved surface of the pedal body 32. The associated springs 40 are now adjustably placed under tension. The spring force adjustment member 42 forms a spring force adjustment arrangement that is operatively coupled to the springs 40 (i.e., a rear biasing element) to adjust an urging force applied by the springs 40 (i.e., a rear biasing element) on the rear cleat retainer 36.

In particular, the spring force adjustment member 42 is provided with three (3) different spring contact surfaces for adjusting the clamping force. The spring force adjustment member 42 is held against the pedal body 32 by the force of the rear torsion springs 40. By rotating the spring force adjustment member 42, different spring contact surfaces engage the rear torsion springs 40. The three spring contact surfaces are spaced at different distances from a center axis of the adjustment member so that the twisting amount of the rear torsion springs 40 is adjusted depending on which of the spring contact surfaces are engaged with the rear torsion springs 40. The spring force adjustment member 42 is provided with a tool engagement structure (hexagonal hole) for receiving a tool so that the spring force adjustment member 42 can be rotated in place on curved engagement surfaces of the pedal body 32.

Second Embodiment

Figure 13:
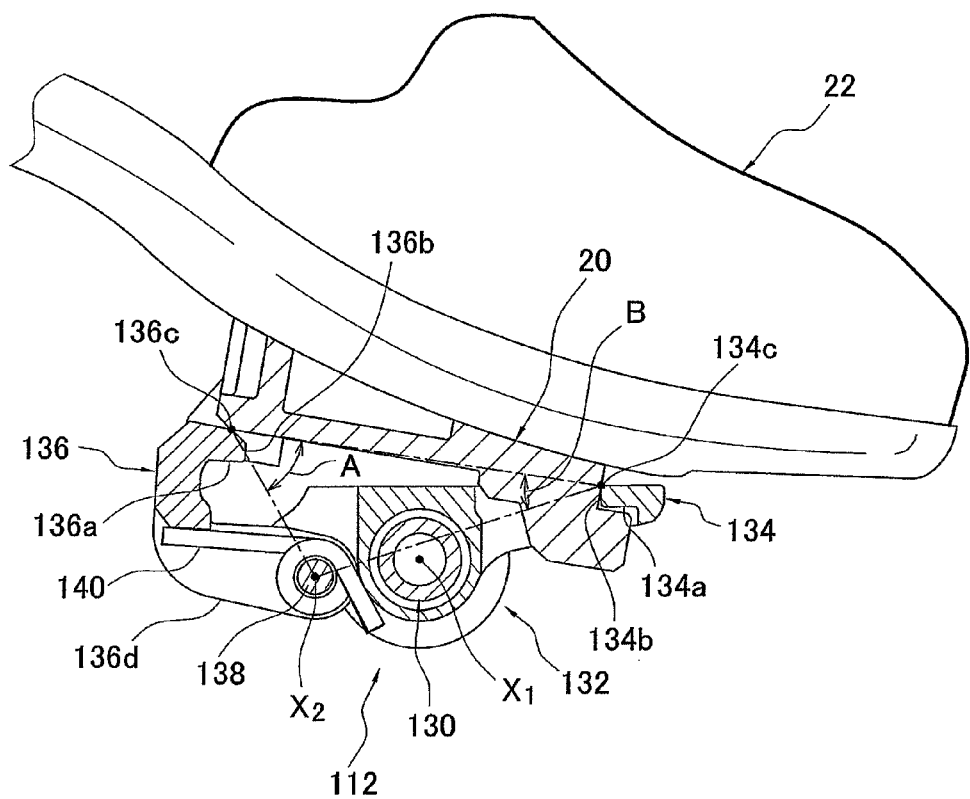
FIG. 13 is longitudinal (center) cross-sectional view of a right bicycle pedal in accordance with a second embodiment, with the cleat of the first embodiment being shown in initial contact with the rear cleat retainer of the right bicycle pedal.
Figure 14:
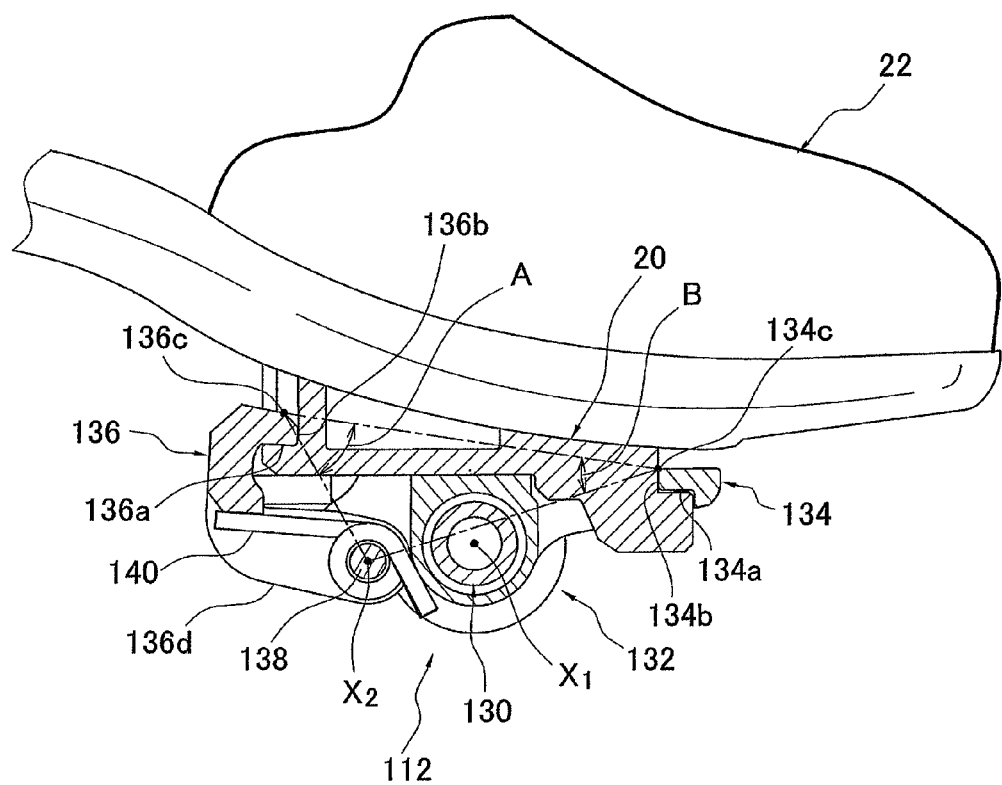
FIG. 14 is a longitudinal (center) cross-sectional view, similar to FIG. 13, of the right bicycle pedal in accordance with the second embodiment, with the cleat of the first embodiment being shown in full engagement with the rear cleat retainer of the right bicycle pedal.

Referring now to FIGS. 13 and 14, a bicycle pedal 112 is illustrated in accordance with a second embodiment of the present invention. The bicycle pedal 112 of this second embodiment is configured to be used with the bicycle shoe cleat 20. The bicycle pedal 112 basically includes a pedal shaft or spindle 130, a pedal body 132 with an integrated front cleat retainer 134, a rear cleat retainer 136, a rear pivot pin 138 and a pair of rear torsion springs 140 (only one shown). In this second embodiment, the rear end of the pedal body 132 has been modified to eliminate the spring force adjustment structure of the first embodiment. Also, the rear end of the pedal body 132 and the rear cleat retainer 136 has been modified so that the pivot axis $X_2$ is closer to the axis $X_1$ of the pedal shaft 130. Thus, the bicycle pedals 12 and 112 are identical, unless otherwise described and/or illustrated herein as being different.

In view of the similarities between this second embodiment and the first embodiment, the following description will focus mainly on the differences. However, it will be apparent to those skilled in the art from this disclosure that most of the descriptions of the first embodiment also apply to this second embodiment.

The front cleat retainer 134 is disposed on the front end of the pedal body 32. Preferably, the front cleat retainer 134 is integrally formed with the pedal body 132 such that the pedal body 132 and the front cleat retainer 134 are a one-piece, unitary member. Thus, the front cleat retainer 134 is preferably formed of lightweight rigid metallic material such as aluminum alloy. The front cleat retainer 134 has a downwardly facing first cleat retaining surface 134a and a front pedal control surface 134b with a forward cleat stopping point 134c facing towards the rear end of the pedal body 32. The forward cleat stopping point 134c is a point that lies at the center of the front pedal control surface 134b. The front cleat retainer 134 is identical to the front cleat retainer 34.

The rear cleat retainer 136 has a roughly U-shaped configuration, with its two ends being pivotally supported by the pivot pin 138 that passes between the side portions of the rear end of the pedal body 132. In other words, the rear cleat retainer 136 is pivotally coupled to the rear end of the pedal body 132 about a rear pivot axis $X_2$ by the pivot pin 138. The rear cleat retainer 136 has a rear clamping portion that includes a downwardly facing second cleat retaining surface 136a, a rear pedal control surface 136b and a rear cleat step-in point 136c facing away from the pedal body 132. The rear cleat retainer 136 has a pair of mounting flanges 136d (only one shown) for mounting the rear cleat retainer 136 on the pivot pin 138. The rear cleat retainer 136 is identical to the rear cleat retainer 36, except for the mounting flanges 136d, which extend further forward so that the rear pivot axis $X_2$ is located closer to the axis $X_1$ of the pedal shaft 130.

As seen in FIGS. 13 and 14, similar to the first embodiment, the forward cleat stopping point 134c, the rear pivot axis $X_2$ and the rear cleat step-in point 136c are arranged to define a triangle with a first side of the triangle interconnecting the forward cleat stopping point 134c and the rear cleat step-in point 136c, a second side of the triangle interconnecting the rear cleat step-in point 136c and the rear pivot axis $X_2$, and a third side of the triangle interconnecting the forward cleat stopping point 134c and the rear pivot axis $X_2$. Thus, similar to the first embodiment, the forward cleat stopping point 134c, the rear pivot axis $X_2$ and the rear cleat step-in point 136c are arranged such that the triangle is an acute triangle. In this illustrated embodiment the interior angle A is 52 degrees and the front interior angle B is 26.5 degrees. Also similar to the first embodiment, the rear pivot axis $X_2$ of the rear cleat retainer 136 is located closer to the forward cleat stopping point 134c of the front cleat retainer 134 than the rearward cleat stopping point 136b of the rear cleat retainer 136. Preferably, the forward cleat stopping point 134c, the rear pivot axis $X_2$ and the rear cleat step-in point 136c are further arranged such that the third side of the triangle lies above the center rotation axis $X_1$ of the pedal shaft 130.

In this embodiment, the retaining forces of the springs 140 on the rear cleat retainer 136 are mainly controlled by changing the springs 140 with either weaker or stronger springs. Of course, the shape and the construction of the rear cleat retainer 136 can be modified to change the cleat retaining force if needed and/or desired. Thus, the rear cleat retainer 136 and/or the springs 140 can be easily exchanged to control the cleat retaining force of the pedal 112 or to replace a damaged part.

General Interpretation of Terms

In understanding the scope of the present invention, the term "configured" as used herein to describe a component, section or part of a device includes hardware and/or software that is constructed and/or programmed to carry out the desired function. In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. As used herein to describe the present invention, the following directional terms "forward, rearward, above, downward, vertical, horizontal, below and transverse" as well as any other similar directional terms refer to those directions of a bicycle equipped with the pedal 12 or 112 in a normal in-use position. Accordingly, these terms, as utilized to describe the present invention should be interpreted relative to the pedal being in the normal in-use position as used in the normal riding position. Finally, terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A bicycle pedal comprising:
    a pedal shaft;
    a pedal body having a first end and a second end, with the pedal shaft being rotatably coupled to the pedal body;
    a front cleat retainer disposed on the first end of the pedal body, the front cleat retainer having a downwardly facing first cleat retaining surface and a forward cleat stopping point facing towards the second end of the pedal body;
    a rear cleat retainer having a mounting flange and a rear clamping portion, the mounting flange being pivotally coupled to the second end of the pedal body by a pivot pin for pivotal movement about a rear pivot axis defined by the pivot pin, the pivot pin extending through the mounting flange and through the second end of the pedal body, the rear clamping portion having a downwardly facing second cleat retaining surface and a rear cleat step-in point facing away from the pedal body, the mounting flange and the rear clamping portion being free of any pivot points therebetween; and a rear biasing element operatively disposed between the pedal body and the rear cleat retainer to bias the rear clamping portion to a first position, the forward cleat stopping point, the rear pivot axis and the rear cleat step-in point are arranged to define a triangle with a first side of the triangle interconnecting the forward cleat stopping point and the rear cleat step-in point, a second side of the triangle interconnecting the rear cleat step-in point and the rear pivot axis, and a third side of the triangle interconnecting the forward cleat stopping point and the rear pivot axis, with the triangle having an interior angle between the first and second sides of the triangle with the rear clamping portion in the first position, the interior angle being within the range of 52 degrees and 72 degrees.

2. The bicycle pedal according to claim 1, wherein the rear pivot axis of the rear cleat retainer is located closer to a rearward cleat stopping point of the rear cleat retainer than the forward cleat stopping point of the front cleat retainer.

3. The bicycle pedal according to claim 1, wherein the pedal body has a center cleat contacting surface lying in a horizontal plane disposed below the second cleat retaining surface of the rear clamping portion.

4. The bicycle pedal according to claim 3, wherein the horizontal plane of the center cleat contacting surface of the pedal body is disposed above the first cleat retaining surface of the front cleat retainer.

5. The bicycle pedal according to claim 1, wherein the front cleat retainer is non-movably coupled to the pedal body.

6. The bicycle pedal according to claim 1, further comprising a spring force adjustment arrangement operatively coupled to the rear biasing element to adjust an urging force applied by the rear biasing element on the rear cleat retainer.

7. The bicycle pedal according to claim 1, wherein the forward cleat stopping point, the rear pivot axis and the rear cleat step-in point are further arranged such that the triangle has a front interior angle between the first and third sides of the triangle that lies within the range of 21 degrees and 26.5 degrees.

8. The bicycle pedal according to claim 1, wherein the forward cleat stopping point, the rear pivot axis and the rear cleat step-in point are further arranged such that the third side of the triangle lies above a center rotation axis of the pedal shaft.

9. The bicycle pedal according to claim 1, wherein the forward cleat stopping point, the rear pivot axis and the rear cleat step-in point are further arranged such that the triangle is an acute triangle.

10. The bicycle pedal according to claim 1, wherein the interior angle lies within the range of 52 degrees and 70 degrees.

11. The bicycle pedal according to claim 1, wherein the interior angle lies within the range of 52 degrees and 68 degrees.

12. The bicycle pedal according to claim 1, wherein the interior angle lies within the range of 52 degrees and 66 degrees.

13. The bicycle pedal according to claim 1, wherein the interior angle lies within the range of 52 degrees and 64 degrees.

* * * * *